July 7, 1970  L. A. HOLLAND ET AL  3,519,371
MULTISTAGE MECHANICAL VACUUM PUMP ARRANGEMENTS
Filed Sept. 18, 1968
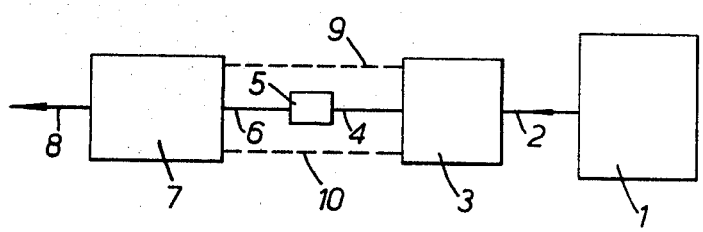
LESLIE A. HOLLAND,
MALCOLM A. BAKER,
LAURENCE LAURENSON,
INVENTORS
BY Hall & Houghton
ATTORNEY

Patent text

3,519,371
MULTISTAGE MECHANICAL VACUUM PUMPING ARRANGEMENTS

Leslie Arthur Holland and Malcolm Arthur Baker, Crawley, and Laurence Laurenson, Horsham, England, assignors to Edwards High Vacuum International Limited, Sussex, England, a British company
Filed Sept. 18, 1968, Ser. No. 760,521
Claims priority, application Great Britain, Apr. 16, 1968, 17,811/68
Int. Cl. F25j 3/00; F04b 41/06; F04d 25/16
U.S. Cl. 418—5                     5 Claims

ABSTRACT OF THE DISCLOSURE

A multistage mechanical vacuum pumping arrangement including an oil lubricated low vacuum stage, a trap for backstreaming organic vapours and a higher vacuum stage which is dry (non-lubricated). The trap suitably contains a sorbent material such as activated alumina. The higher vacuum stage preferably has a compression ratio in excess of 100 to 1 and, because its co-operating pumping components are in rubbing contact, some form of self-lubrication is desirable.

---

This invention relates to multistage mechanical vacuum pumping arrangements.

According to the present invention a multistage mechanical vacuum pumping arrangement includes an oil lubricated low vacuum stage, a "dry" higher vacuum stage as hereinafter defined and means connecting the two stages which includes a trap for inhibiting the backstreaming of organic vapours from the low to the higher vacuum stage.

Throughout this specification and in the appended claims a "dry" pumping stage refers to a pumping stage in which conventional lubrication methods using a lubricant of an organic nature which gives off vapours during pumping are absent. Such lubricants are, for instance, mineral oils or synthetic fluid lubricants and are used in the low vacuum stage which is preferably fluid sealed. The "dry" stage may, however, be provided with any form of lubrication which does not evaporate, decompose nor in any way introduce a vapour contaminant into the system during pumping. Suitably the co-operating pumping elements of the higher vacuum stage may be self lubricating members comprising, for instance, carbon and/or molybdenum disulphide filled P.T.F.E. compounds.

The compression ratio of the higher vacuum stage is preferably in excess of 100:1.

The two stages may be driven separately and may comprise, if required, different forms of rotary pump, but they may also be driven in phase from a common shaft or shafts. The dry stage may have lubricated bearings for its shaft or shafts as long as these are isolated from the high vacuum side by suitable shaft seals. Dry bearings can also be used in the dry stage and these should be associated with shaft seals to reduce gas leakage.

The two stages may comprise a composite pumping unit but this is by no means essential.

The trap, suitably a sorbent trap containing activated alumina in the form of smooth faced beads or pellets, acts to inhibit contaminating organic oil vapours backstreaming from the low vacuum stage from passing through the high vacuum stage. Such a trap operates satisfactorily in carrying out this function. However, during the early stages of pump-down and most notably at pressures higher than those at which serious backstreaming of oil vapours commences the alumina (or other sorbent) in the trap absorbs water vapour from the medium being pumped. As pumping continues and the pressure in the region of the trap is lowered further, below about 1 torr, desorption of the water vapour occurs. This limits the ultimate interstage pressure so that, to ensure a required ultimate pressure at the high vacuum side of the pumping arrangement, this interstage pressure must be withstood by the compression ratio of the higher vacuum stage. For this reason the compression ratio of the higher vacuum stage is preferably in excess of 100 to 1, this being most easily obtained if there is rubbing contact between the co-operating pumping components. The higher vacuum stage can either be connected to the system to be evacuated directly or by way of a further pump, such as a diffusion pump. In addition an electrical pump, such as a getter ion pump, may be used in the system.

The positioning of the trap between the two stages provides considerable advantage over known arrangements of a two stage pump in which a trap is placed on the high vacuum side. The disadvantage of the known arrangement is that the ultimate pressure attained is so much impaired by the pressure of water vapour absorbed by the trap that the benefit of a two stage pump is sometimes almost lost. Not only does the provision of one stage of the pump above the trap to a large extent overcome this disadvantage but, by ensuring that the stage above the trap is dry, organic contamination of the vessel being pumped is also considerably reduced. Thus the advantage of the trap is still attained without suffering the hitherto found disadvantage.

The invention will now be described with reference to the accompanying drawing which shows a block diagram of a pumping arrangement in accordance with the invention.

Referring now to the drawing, a system 1 to be evacuated is connected over pumping line 2 to a high vacuum rotary vacuum pump 3. This pump may be any form of rotary pump and is suitably of the eccentric rotor type. It is not lubricated by oil but its co-operating pumping components, the eccentric rotor and the follower in the mentioned case, are self-lubricating. They may comprise, for instance, carbon and/or molybdenum disulphide filled P.T.F.E. compounds. The low vacuum side of this pump is connected over pumping line 4 to an oil sorbent trap 5 and then over a further pumping line 6 to a conventional oil sealed pump 7, which might also be of the eccentric rotor type. Pump 7 delivers to atmosphere at 8.

The trap 5 is filled with smooth faced beads or pellets of activated alumina, these serving to trap the backstreaming oil from pump 7. However, for the reasons already mentioned, desorption of water vapour from the alumina tends to incerase the interstage pressure in pumping lines 4 and 6. The pump 5 must therefore have a sufficient compression ratio to withstand this pressure if the ultimate vacuum required is not to be impaired. The pump 3 should therefore in most circumstances have a compression ratio in excess of 100:1 and preferably in the region of 1000:1.

The drawing also illustrates in diagrammatic form an arrangement in which pump 3 may be driven directly by pump 7 so that they form a composite single drive unit. Dotted lines 9 and 10 represent mechanical connections between the corresponding co-operating pumping components of the two pumps. In most acses, for instance screw rotor types of pump or eccentric rotor types, these lines 9 and 10 represent the rotor or rotor and follower shafts.

We claim:
1. A multistage mechanical vacuum pumping arrangement including in combination:
   (a) an oil lubricated low vacuum stage;
   (b) a dry higher vacuum stage provided with co-operating pumping components which are in rubbing contact; and
   (c) connecting means between said low vacuum stage and said higher vacuum stage for the passage of a medium being pumped, said connecting means including an organic vapour trap.

2. A multistage mechanical vacuum pumping arrangement including in combination:
 (a) an oil lubricated low vacuum stage;
 (b) a dry higher vacuum stage provided with co-operating pumping components which are in rubbing contact and comprise a carbon and molybdenum disulphide filled polytetrafluorethylene compound; and
 (c) connecting means between said low vacuum stage and said higher vacuum stage for the passage of a medium being pumped, said connecting means including an organic vapour trap.

3. A multistage mechanical vacuum pumping arrangement including in combination:
 (a) an oil lubricated low vacuum stage;
 (b) a dry higher vacuum stage provided with co-operating pumping components which are in rubbing contact and comprise a carbon filled polytetrafluorethylene compound; and
 (c) connecting means between said low vacuum stage and said higher vacuum stage for the passage of a medium being pumped, said connecting means including an organic vapour trap.

4. A multistage mechanical vacuum pumping arrangement including in combination:
 (a) an oil lubricated low vacuum stage;
 (b) a dry higher vacuum stage provided with co-operating pumping components which are in rubbing contact and comprise a molybdenum disulphide filled polytetrafluorethylene compound; and
 (c) connecting means between said low vacuum stage and said higher vacuum stage for the passage of a medium being pumped, said connecting means including an organic vapour trap.

5. A multistage mechanical vacuum pumping arrangement according to claim 1 in which said higher vacuum stage is provided with first co-operating pumping components and said low vacuum stage is provided with second co-operating components, said arrangement being provided with drive means connected between said stages arranged and adapted to cause said first pumping components to follow in phase said second pumping components.

References Cited
UNITED STATES PATENTS

| | | | |
|---|---|---|---|
| 2,636,655 | 4/1953 | McFee | 230—45 X |
| 2,902,210 | 9/1959 | Power | 230—45 X |
| 2,935,243 | 5/1960 | Sadler | 230—45 |
| 2,968,160 | 1/1961 | Schilling et al. | 62—18 X |
| 3,007,624 | 11/1961 | Netzel | 230—45 X |
| 3,085,913 | 4/1963 | Caswell | 230—45 X |
| 3,353,742 | 11/1967 | Bowman et al. | 230—101 |

ROBERT M. WALKER, Primary Examiner

W. J. KRAUSS, Assistant Examiner

U.S. Cl. X.R.
418—152